United States Patent [19]

Munsterman et al.

[11] Patent Number: 5,758,449
[45] Date of Patent: Jun. 2, 1998

[54] JUGLINE FISHING FLOAT HAVING BITE INDICATOR

[76] Inventors: Michael G. Munsterman, 1801 E. 6th St., Sedalia, Mo. 65301; Randall K. Harvey, P.O. Box 3005, Sedalia, Mo. 65302

[21] Appl. No.: 706,257

[22] Filed: Sep. 4, 1996

[51] Int. Cl.⁶ .......................... A01K 95/01; A01K 75/02
[52] U.S. Cl. .................................... 43/17; 43/17.5
[58] Field of Search ............................... 43/17, 17.5

[56] References Cited

U.S. PATENT DOCUMENTS

| | | | |
|---|---|---|---|
| 2,798,330 | 7/1957 | Carraway et al. | 43/17 |
| 2,914,879 | 12/1959 | Humes et al. | 43/17 |
| 3,739,513 | 6/1973 | Durham, Jr. | 43/17 |
| 4,461,114 | 7/1984 | Riead | 43/17.5 |
| 4,607,449 | 8/1986 | Brachear | 43/43.11 |
| 4,658,532 | 4/1987 | McFarland et al. | 43/17.5 |
| 4,660,316 | 4/1987 | Gamelin | 43/17 |
| 4,697,374 | 10/1987 | Simms | 43/17.5 |
| 4,748,761 | 6/1988 | Machovina | 43/17 |
| 4,884,355 | 12/1989 | Neihoff et al. | 43/17 |
| 4,916,846 | 4/1990 | Pehm | 43/17.5 |
| 4,922,643 | 5/1990 | Everett | 43/17.5 |
| 5,036,615 | 8/1991 | Lu | 43/17.5 |
| 5,052,145 | 10/1991 | Wang | 43/17.5 |
| 5,119,578 | 6/1992 | Johnson | 43/17 |
| 5,199,205 | 4/1993 | Klammer | 43/17 |
| 5,265,369 | 11/1993 | Botkins | 43/43.11 |
| 5,351,432 | 10/1994 | Tse | 43/17.5 |
| 5,615,512 | 4/1997 | Wang | 43/17.5 |

FOREIGN PATENT DOCUMENTS

| 1620068 | 1/1991 | U.S.S.R. | 43/17 |
|---|---|---|---|

*Primary Examiner*—Michael J. Carone
*Assistant Examiner*—Theresa M. Wesson
*Attorney, Agent, or Firm*—Jacobson, Price, Holman & Stern, PLLC

[57] ABSTRACT

A jugline fishing float visually indicates to a fisher the location of the float and when a fish has been caught, and is especially suitable for nighttime fishing. The jugline fishing float has a housing with an upper and lower container removably connected to a divider. The divider supports a stage having a circuit board mounted to a platform thereon. A mechanical actuation system is mounted to the underside of the stage. The mechanical actuation system has a contact bar which pivots about a pivot pin. The contact bar is biased against a position indicator contact by a spring attached at one end of the contact bar. A battery supplies energy to actuate a white position indicator lamp in response to the position indicator contact electrically communicating with the contact bar. The indicator lamp signals the position of the jugline fishing float to the fisher. A swivel and leader line are connected to the contact bar such that, when a fish is caught, the contact bar will disconnect from the position indicator contact and connect with a fish indicator contact. Energy from the battery will then be transferred from the position indicator lamp to a green fish indicator lamp. Thus, when a green light is shining, the fisher will be informed that a fish has been caught and the float is to be retrieved.

19 Claims, 2 Drawing Sheets

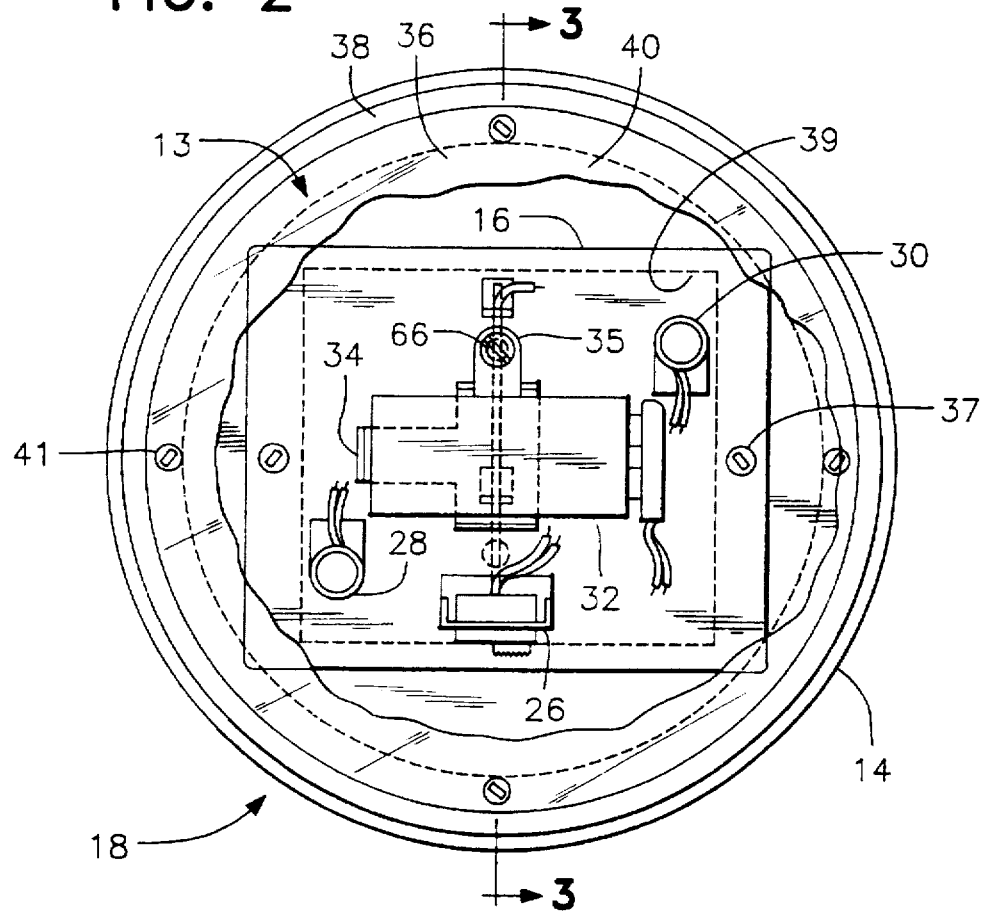
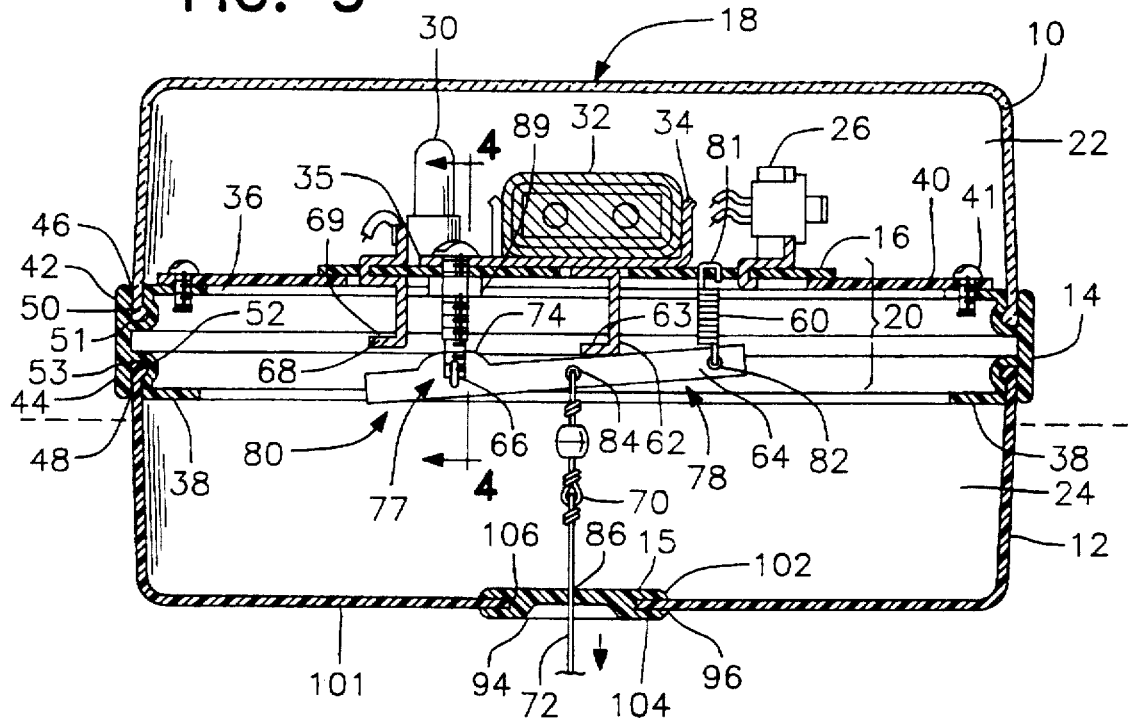

JUGLINE FISHING FLOAT HAVING BITE INDICATOR

BACKGROUND OF THE INVENTION

1. Field of the Invention

The present invention relates to a jugline fishing float. More particularly, the present invention relates to a jugline fishing float that visually signals its location and when a fish is caught.

2. Description of the Related Art

Jugline fishing is commonly accomplished by securing a hook and line to a float or "jug", without the use of a fishing pole or the like. The fisher can then place several jugs in the water at the same time since, unlike pole-line fishing, the jugs do not require constant individual attention. The jugline fisher need only periodically check each jug to determine if a fish has been caught. Fishing jugs are shown, for example, in U.S. Pat. Nos. 5,265,369 and 4,607,449.

Compared to pole line fishing, jugline fishing generally requires less attention for each line. Nonetheless, the jugline fisher must keep track of the location of each jug and then check each jug individually in order to determine if a fish has been caught. The more often the jugs are checked, the fewer the number of jugs that can be simultaneously maintained. Likewise, the less often the jugs are checked, the more likely it will be that a fish has been caught without being retrieved in a timely manner. Consequently, the chances increase that the fish will be lost and the jug will not be available to catch additional fish.

Accordingly, there is a need for a jug with a signalling device which clearly marks the position of each jug, so that the fisher may easily locate the jugs, especially at night, and which indicates to the fisher that a fish has been caught without the fisher having to personally check the line. In this regard, fishing bobbers have been developed for attachment to pole fishing lines that visually signal to a fisher when a fish has been caught. Such devices are shown, for example, in U.S. Pat. Nos. 5,351,432, 5,199,205, 5,119,578, 5,052,145, 5,036,615, 4,916,846, 4,884,355, 4,748,761 and 4,461,114. These bobbers have a light which is actuated in response to a fish striking the fishing line in order to signal the fisher that a fish has been caught. Further, the bobber disclosed in U.S. Pat. No. 5,351,432 has a second indicating light which remains lit so long as the battery is active.

These fishing bobbers, however, are generally configured to be used in conjunction with the fishing pole line and, generally, are not shaped or sturdy enough to retain a fish without being secured by a remotely located fisher in conjunction with a fishing pole or the like.

SUMMARY OF THE INVENTION

A jugline fishing float is provided for continuously indicating to a fisher the location of the float, especially during nighttime fishing, and then visually signaling the fisher that a fish has been caught. The jugline fishing float has a generally flat circular housing with an upper and lower container removably connected to a divider. The divider supports a platform which has an opening therein. A circuit board is mounted about the opening of the platform, having electronic circuitry on top and a mechanical actuation system on the bottom.

The mechanical actuation system has a contact bar which pivots about a pivot point. The contact bar is biased against a position indicator contact by a spring attached at one end of the contact bar. A battery supplies energy through the contact bar and position indicator contact to actuate a position indicator lamp. The position indicator lamp provides a continuous signal of the position of the jugline fishing float to the fisher.

A swivel and leader is connected to the contact bar such that, when a fish is caught, the contact bar will disconnect from the position indicator contact and connect with a fish indicator contact. Energy from the battery will thereby be transferred from the position indicator lamp, which for example is clear, to a fish indicator lamp, which is a colored light, such as green. Thus, when the clear light is illuminated, the fisher will be continuously informed of the location of the jugline fishing float. Then, when the green light is illuminated, the fisher will be informed that a fish has been caught and the float is to be retrieved. The present invention is especially suitable for nighttime fishing of catfish and other fish that normally feed at night.

It is therefore a primary object of the present invention to provide a jugline float with a continuous indicator of its position even when no fish is on the line.

It is a further object of the invention to provide a jugline float for visual indicating to a fisher when a fish has been caught.

It is a still further object of the present invention to provide a float having a generally flat shape and sturdy enough to be used for jugline fishing.

It is another object of the present invention to provide an improved float that provides visual lighted indication to the fisher of a fish bite or strike.

Yet another object of this invention to be specifically enumerated herein is to provide a jugline fishing float in accordance with the preceding objects and which will conform to conventional forms of manufacture, be of simple construction and easy to use so as to provide a device that will be economically feasible, long lasting and relatively trouble free in operation, and which parts can be easily replaced.

Still another object of the present invention is to provide a jugline float that continuously indicates its location by battery powered illumination for nighttime fishing for catfish and other fish that feed at night.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a cut-away top view of the jugline fishing float shown in FIG. 1.

FIG. 3 is a side view of the jugline fishing float taken along line 3—3 of FIG. 2.

DETAILED DESCRIPTION OF THE PREFERRED EMBODIMENTS

Figure 1:
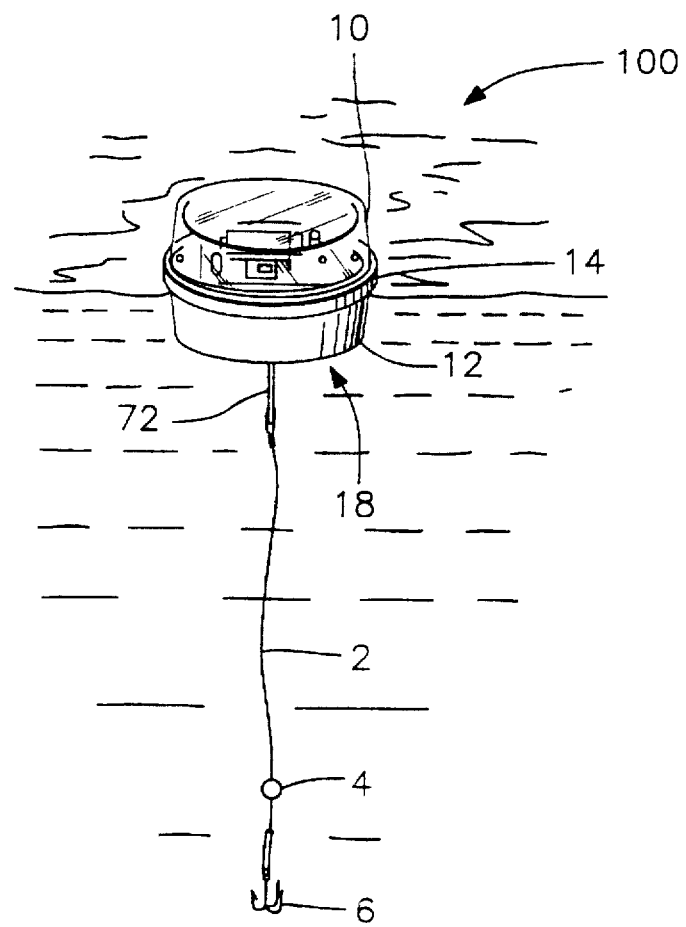
FIG. 1 is an environmental perspective view of the preferred jugline fishing float in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring to the drawings, FIG. 1 shows the jugline fishing float 100 in accordance with the preferred embodiment of the present invention. The float 100 generally consists of a sealed housing 18 having an upper container 10, a lower container 12, a divider 14, and stage 13 which comprises platform 40, circuit board 16, and plug 15 (shown in FIG. 3). Housing 18 is designed to float on the surface of water, such as for use in a lake or the like. Preferably, housing 18 is generally flat and circular in shape, but other shapes could be employed that permit the housing and its components to float on the water surface. A leader 72 extends out of the bottom of the lower container 12 of housing 18 and connects with a fishing line 2 having a weight 4 and hook 6 in a conventional manner.

Turning to FIGS. 2 and 3, float 100 further has a circuit board 16 and mechanical actuation system 20, each located within the housing 18. The upper and lower containers 10, 12 meet at divider 14 which connects the containers together and divides the interior of the housing 18 into generally a top section 22 and bottom section 24. The top section 22 contains the electronic circuit board 16, which has an ON/OFF slide switch 26, a position indicator lamp 28, a fish indicator lamp 30, and a battery 32 housed in battery holder 34. The bottom section 24, on the other hand, contains the mechanical actuation system 20, which will be discussed in further detail below.

The divider 14 is a generally U-shaped ring, having a centrally located opening 36 and inwardly turned legs 38. Stage 13 comprises a circular platform 40 which supports circuit board 16. The platform 40 is fitted over the opening 36 of divider 14 and mounted to the upper leg 38 of divider 14. Preferably, the platform 40 is made of clear plexiglass, and is mounted to upper leg 38 by four screws 41 at equally spaced locations on the outer border of platform 40. The screws 41 are placed through holes provided in platform 40 and threaded into upper leg 38. Alternatively, the platform 40 can be secured to the brim 38 by any suitable securing structure such as nuts and bolts extending through aligned holes.

Accordingly, the divider 14 retains the platform 40 at a fixed location within the housing 18, preferably intermediate between the upper and lower containers 10 and 12. The platform 40 also has an opening 39 which receives the circuit board assembly 16. Circuit board 16 is mounted about the opening 39 of platform 40 so that, when the jugline fishing float 100 is fully assembled, the circuit board 16 is in the top section 22 of the housing 18 and the mechanical actuation system 20 is in the bottom portion 24 of housing 18.

Preferably, the circuit board 16 and opening 39 are rectangular in shape and the circuit board 16 is mounted to platform 40 by placing two bolts 37 at the center of two opposing sides of board 16. The bolts 37 are preferably positioned through holes in board 16 and secured on the underside of platform 40 by nuts (not shown). Alternatively, however, screws may be driven through board 16 and into platform 40.

As further shown in FIG. 3, upper and lower lips 42, 44 are located along the outer border of divider 14 in order to engage with the upper and lower containers 10, 12, respectively. Lips 42, 44 form channels 46, 48 that cooperatively receive rims 50, 52 of the upper and lower containers 10, 12, respectively. Rims 50 and 52 have an inwardly turned boss 51 and 53, respectively, which couples with a corresponding portion of channel 46, 48. Rims 50 and 52 mate with lips 42, 44 to form a water-tight seal between containers 10, 12 and divider 14. The containers 10, 12 are thereby removably engaged with divider 14 and may be easily separated from divider 14 so that any worn or damaged parts may be easily replaced.

The mechanical actuation system 20 is mounted to the underside of circuit board 16 of stage 13 so as to be primarily positioned, when the jugline fishing float 100 is fully assembled, in the bottom section 24 of housing 18. The mechanical actuation system 20 generally comprises a spring 60, position indicator contact 62, rocker arm or contact bar 64, switch contact 66, fish indicator contact 68, swivel 70, and leader 72.

Figure 4:
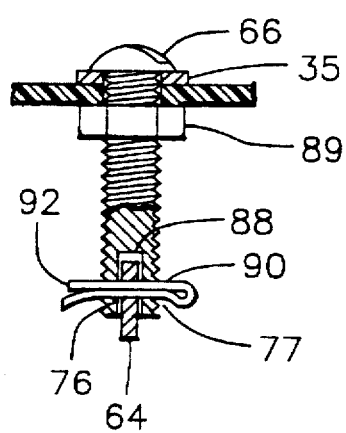
FIG. 4 is a side view showing the connection between the switch contact and the contact bar taken along line 4—4 of FIG. 3.

The rocker arm or contact bar 64 preferably has a curved raised portion 74 which is pivotally connected to the lower end of switch contact 66. As shown in FIG. 4, an elongated groove or slot 88 is cut diagonally across the tail end of switch contact 66, and a through-hole 90 is drilled transverse to, and intersecting with the slot 88. The raised portion 74 of contact bar 64 is fitted in slot 88 and hole 76 of contact bar 64 is held in alignment with through-hole 90 by a cotter pin 92, or the like to thus pivotally fasten contact bar 64 to switch contact 66. In this way, switch contact 66 operates to mechanically support contact bar 64 and form the pivot point 77 which divides contact bar 64 into a long section 78 and a short section 80. By preferably mounting contact bar 64 to the lower end of switch contact 66 by a removably cotter pin 92, the contact bar 64 is electrically connected to switch contact 66, as well as removably and pivotally supported thereon.

The position indicator contact 62 and fish indicator contact 68 are each mounted to circuit board 16 and extend downwardly a first distance in the bottom portion 24 of housing 18. Likewise, switch contact 66 is mounted to circuit board 16 and extends further downwardly in the bottom portion 24 to a second distance. Accordingly, the tail end of switch contact 66 and pivot 77 are lower than both the position indicator contact 62 and fish indicator contact 68 so that the contact bar 64 may be pivotally mounted to the end of switch contact 66 without interference from either the position indicator contact 62 or the fish indicator contact 68.

In the preferred embodiment, the switch contact 66 is a one-inch long ¼ inch bolt, whereas contacts 62, 68 are approximately ½ inch metal members. The switch contact 66 extends down from the top of circuit board 16 and is secured by nut 89 on the underside of circuit board 16. In addition, a battery holder 34 is mounted to the top of the circuit board 16 to receive battery 32. The head of the switch contact bolt 66 preferably extends through a mounting member 35 in the battery holder 34 to secure the battery holder 34 to the circuit board 16. As shown in FIG. 2, bolt 66 is offset from holder 34. However, holder 34 may be positioned so that bolt 66 extends through the center of holder 34, beneath battery 32.

Contacts 62, 68 are electrically conductive members that are preferably soldered to the bottom of circuit board 16. Also, preferably, contacts 62 and 68 have horizontally positioned stems 63 and 69, respectively, which provide a greater surface area to insure dependable electrical communication between contacts 62, 68 and contact bar 64. Lead lines electrically connect the contacts 62 and 68 with the respective lamps 28 and 30. The position indicator contact 62 and fish indicator contact 68 are mounted on either side of switch contact 66. Preferably, however, fish indicator contact 68 is mounted on the short section 80 of contact bar 64 and the position indicator contact 62 is mounted on the long section 78 of contact bar 64.

Spring 60 is connected to contact bar 64 at hole 82, which is preferably located at the distal end of long section 78 opposite pivot point 77. As shown in FIG. 3, spring 60 maintains the contact bar 64 in a biased position to rest against position indicator contact 62. The other end of spring 60 is mounted in any convenient manner, such as in two holes 81 located in circuit board 16. The end of spring 60 extends through the first hole and back through the second hole. Preferably, the spring 60 is not permanently affixed so that the spring 60 and contact bar 64 may be easily replaced or otherwise removed. The spring is chosen to have sufficient force to retain contact bar 64 in a biased position against position indicator contact 62 when no fish is on the line. In addition, the spring allows the contact bar 64 to pivot about pivot point 77 when a fish is caught.

The swivel 70 is connected to contact bar 64 at swivel connect point 84, which is along long section 78. Preferably, the swivel connect point 84 is located approximately near the center of contact bar 64. A steel leader 72 is connected to swivel 70 and extends through pin hole 86 in rubber grommet 15 to the outside of housing 18. A fishing line 2 and hook 6 are connected to the end of leader 72. Hence, when a fish is caught, the fish will pull down on leader 72 which, in turn, pulls contact bar 64 downwardly against the force of spring 60. The leader 72 is designed to freely move within grommet 15, so as to provide unrestricted communication between the hook and contact bar 64.

In response to the force of a fish on hook 6, the long section 78 of contact bar 64 will move downward and the short section 80 will move upward. Accordingly, the contact bar 64 will now touch fish indicator contact 68, and no longer touch position indicator contact 62. If the fish frees itself, or if the pulling is due to a momentary snag, the contact bar 64 will return to the original position against position indicator contact 62 under the force of spring 60.

Figure 5:
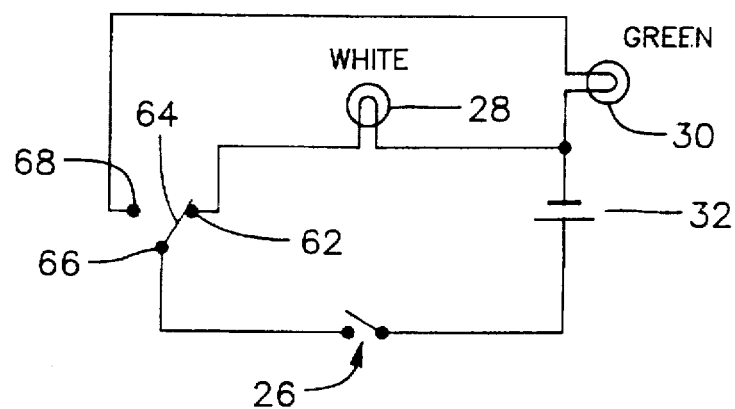
FIG. 5 is a circuit diagram of the electrical components in accordance with the jugline fishing float of FIG. 3.

As further shown by the circuit diagram of FIG. 5, the contact bar 64 operates as an electrical switch to operatively connect either the position indicator contact 62, or the fish indicator contact 68 with battery supply 32. As the contact bar 64 touches position indicator contact 62, the battery 32 will activate position indicator lamp 28 to emit a light. Likewise, as contact bar 64 touches fish indicator contact 68, the battery 32 will activate fish indicator lamp 30 to emit a light. Preferably, the position indicator lamp 28 is a clear bulb of about 300 mA, and fish indicator lamp 30 is a colored bulb, such as green also approximately 300 mA. The bulbs are easily replaceable, and any suitable color and power bulbs may be used.

Slide switch 26 operates so that the fisher may manually turn the system ON and OFF. The slide switch 26 operatively connects one terminal, preferably the positive terminal, of the battery 32 to the switch contact 66. The other terminal of the battery 32 is connected by contact bar 64 to either the fish indicator lamp 30 or position indicator lamp 28 via position indicator contact 62 or fish indicator contact 68, respectively. Thus, when slide switch 26 is open, lamps 28, 30 will not be activated. However, when slide switch 26 is closed, a complete circuit is formed between battery 32 and one of lamps 28, 30 through switch contact 66 and contacts 64, 68, respectively.

The contact bar is biased against position indicator contact 62 so that, once the system is turned ON by slide switch 26, the position indicator lamp 28 will continuously emit a white light, thereby indicating the position of the jugline fishing float 100 to the fisher. The fish indicator lamp 30, on the other hand, is not activated. Once a fish is caught on hook 6, the contact bar 64 will pivot about pivot point 77, disconnect contact with position indicator contact 62 and make contact with fish indicator contact 68. Thus, the position indicator lamp 28 will no longer be activated, and the fish indicator lamp 30 will emit a green light, thereby indicating to the fisher that a fish is on the line. The indicator lamp 30 further serves to indicate the position of the jugline fishing float 100.

The grommet or plug 15 is preferably a soft rubber plug of the type having a depressed center 94 and an outer rim having lips 102, 104 defining a central groove 96. The plug 15 is simply wedged into opening 106, which is preferably located in the center of the outer wall 101 of lower container 12. Accordingly, the groove of plug 15 mates with the lower container 12 such that the plug lips 102, 104 rest on either side of the lower container wall 101, one on the inner side of the wall and one on the outer side of the wall. The plug 15 is water-tight, removable and preferably has a diameter of about ⅛ of an inch. In addition, the plug 15 forms a water-tight seal around leader 72. Thus, when a fish strikes the hook 6 and causes a downward pull on leader 72, the center 94 of plug 15 deflects downwardly the short distance permitted by the pivoting movement of contact bar 64 before it contacts fish indicator contact 68 to retain the water-tight seal around leader 72.

In the preferred form of the invention, the slot 88 is approximately ⅛ of an inch deep and about ¹⁄₁₆th inches wide. The contact bar 64 is preferably formed of sheet metal having a width somewhat less than ¹⁄₁₆th of an inch. In addition, the contact bar 64 is about ⅛ of an inch in height and about 2½ to 3 inches long. The through-hole 90 is approximately ⁷⁄₆₄ths of an inch in diameter.

Further to the preferred embodiment, the jugline fishing float 100 is about four inches in height and has a diameter of approximately seven inches. The upper container 10 is about 1 ½ inches in height and the lower container 12 is about 2 ½ inches in height. The platform 40 is approximately ¼ inch thick. The divider 14 is a flexible plastic and the upper and lower containers 10, 12 are preferably stiff plastic, such as polypropylene or the like. Approximately ⅛ of an inch of the divider 14 lip will rest on the outside of the housing 18. However, the float 100 may be configured in a variety of shapes and sizes and is not limited by the dimensions of the preferred embodiment. Two AA batteries, or a single 9 Volt battery 32 may be utilized, to provide about 8–9 hours of operation. The batteries 32 are easily replaced by merely opening upper container 10 to access battery holder 34.

The jugline fishing float 100 is designed to be fully water-tight to prevent water damage to the electrical circuitry. Even if some water manages to enter the lower container 12, the water will settle on the bottom, so as not to interfere with the mechanical actuation system 20 or circuit board 16. In addition, drainage holes (not shown) may be provided about platform 40 or divider 14 so that any water entering the float 100 will accumulate on the bottom of lower container 12. The water may then be easily withdrawn by removing lower container 12. The containers 10, 12 may both be removed to permit the interior of housing 18 to dry.

Accordingly, the jugline fishing float 100 is designed to be fully submerged. In normal operation, the water line will be about ¾ of an inch from the bottom of housing 18. The housing 18 has a large, flat and preferably circular bottom, which makes the jugline fishing float 100 extremely sturdy so that float 100 does not overturn. However, containers 10, 12, as well as divider 14, are clear, so that light easily passes through, even if the float 100 overturns.

Any number of lamps may be provided so as to make the float 100 more visible to a remotely located fisher. The lamps may be located anywhere within float 100, including on the underside of stage 11 in the bottom portion 24 of housing 18. Also, lower container 12 or its outer wall 101 may be shaded to avoid scaring fish by light emitted from lamps 28, 30. In addition, since the housing 18 is air-tight, the jugline fishing float 100 is extremely buoyant, making it difficult for a fish to fully submerge the float 100. Consequently, fish will tire more quickly than with conventional jugline floats.

A plurality of jugline fishing floats 100 may be used at one time. The fisher only needs to check each float 100 when the fish indicator lamp 30 is activated. When the jugline fishing float 100 is not in use, the leader 72, as well as any fishing line and hook may be stored in the lower container 12.

The foregoing descriptions and drawings should be considered as illustrative only of the principles of the invention. Numerous applications of the present invention will readily occur to those skilled in the art. For example, the fish indicator lamp 30 may be a pulsed light. In addition, the circuitry may be configured to have fish indicator lamp 30 remain activated once tripped. Thus, once a fish is caught, the green light will be lit, even if the fish does not continue to pull on hook 6. Therefore, it is not desired to limit the invention to the specific examples disclosed or the exact construction and operation shown and described. Rather, all suitable modifications and equivalents may be resorted to, falling within the scope of the invention.

We claim:

1. A jugline fishing float comprising:
    a generally flat housing having a removably mounted upper container and lower container;
    a stage secured so as to extend between the upper and lower containers;
    a position indicator lamp mounted to said stage for indicating the position of the fishing float;
    a fish indicator lamp mounted to said stage for indicating that a fish has been caught;
    a position indicator contact electrically connected to said position indicator lamp and mounted to said stage so as to extend down into the lower container;
    a fish indicator contact electrically connected to said fish indicator lamp and mounted to said stage so as to extend down into the lower container;
    a contact bar pivotally supported to said stage so as to switchably connect between said position indicator contact and said fish indicator contact;
    a fishing leader operatively connected to said contact bar for supporting a fishing hook; and
    a biasing element fastened to said contact bar so as to bias said contact bar against said position indicator contact to thereby activate the position indicator lamp when no fish is on the fishing hook, and for permitting the contact bar to connect with said fish indicator contact to thereby activate the fish indicator lamp when a fish strikes the fishing hook.

2. The float of claim 1 further including a divider onto which is removably connected the upper and lower container and on which said stage is removably secured.

3. The float of claim 1 further comprising a battery mounted on said stage for providing power to said position indicating lamp and said fish indicating lamp.

4. The float of claim 3, further comprising a slide switch for operatively turning the battery ON and OFF.

5. The float of claim 1, wherein electrical power is operatively supplied through a support and said contact bar to said position indicator lamp and said fish indicator lamp through said position indicator contact and said fish indicator contact, respectively.

6. The float of claim 1, wherein said stage comprises a platform and a circuit board, wherein the circuit board is mounted about an opening in the platform.

7. The float of claim 1 wherein a slot is located in the end of a support to receive the contact bar having an opening and a through-hole is transversely located in said support for receiving a cotter pin so as to removably fasten said contact bar to said support by said opening.

8. The float of claim 1, wherein said housing further comprises a rubber grommet mounted in a hole located in said lower container, wherein the rubber grommet has a pin hole for receiving a leader connecting the fishing line with the contact bar aperture.

9. The float of claim 1, wherein a support is electrically connected to a battery.

10. The float of claim 1, wherein a support extends a first distance into the lower container and the position indicator contact and fish indicator contact extend a second distance into the lower container, wherein the first distance is substantially greater than the second distance.

11. A fishing float comprising:
    a housing having an upper container, a lower container, a divider removably connecting the upper and lower containers, and a stage removably secured to the divider so as to extend between the upper and lower containers; and,
    a contact bar pivotally attached to the stage and having an aperture for receiving fishing line with a fishing hook, with a spring connected between said contact bar and said stage so as to bias said contact bar to activate a first visual indicator when no fish is on the fishing hook and for permitting the contact bar to activate a second visual indicator when a fish is on the fishing hook.

12. The float of claim 11 wherein said spring is removably fastened between said contact bar and said stage.

13. The float of claim 11 further comprising a battery mounted on said stage for providing power to said first and second indicators.

14. The float of claim 13, further comprising a slide switch for operatively turning the battery ON and OFF.

15. The float of claim 11, wherein electrical power is operatively supplied through said contact bar to said first and second indicators.

16. The float of claim 11, wherein said stage comprises a platform and a circuit board, wherein the circuit board is mounted about an opening in the platform.

17. The float of claim 11, wherein the contact bar has an opening and is mounted to said stage by a support with a slot located in the end of the support to receive the contact bar, wherein the support further has a through-hole transversely located to the slot for receiving a cotter pin so as to removably fasten said contact bar to said support by said opening.

18. The float of claim 11, wherein said housing further comprises a rubber grommet mounted in a hole located in said lower container, wherein the rubber grommet has a pin hole for receiving a leader connecting the fishing line with the aperture of said contact bar.

19. The float of claim 11, wherein said housing is water-tight.

* * * * *